United States Patent [19]
Koiwai et al.

[11] Patent Number: 5,297,175
[45] Date of Patent: Mar. 22, 1994

[54] ASSEMBLING MACHINE FOR NUCLEAR FUEL ASSEMBLY

[75] Inventors: Taichi Koiwai; Katsunori Ohuchi; Nobuo Miwa, all of Ibaraki, Japan

[73] Assignee: Mitsubishi Nuclear Fuel Co., Tokyo, Japan

[21] Appl. No.: 964,019

[22] Filed: Oct. 21, 1992

[30] Foreign Application Priority Data

Oct. 24, 1991 [JP] Japan .................................. 3-278095

[51] Int. Cl.$^5$ .............................................. G21C 19/00
[52] U.S. Cl. ...................................... 376/261; 376/269
[58] Field of Search ........................ 376/261, 269, 270; 29/723, 724; 976/DIG. 283, DIG. 18

[56] References Cited

U.S. PATENT DOCUMENTS

| | | | |
|---|---|---|---|
| 3,940,908 | 3/1976 | Dazen et al. | 53/59 R |
| 4,175,318 | 11/1979 | Matsuura et al. | 29/723 |
| 4,229,255 | 10/1980 | Isaac | 376/264 |
| 4,625,396 | 12/1986 | Ahmed et al. | 29/701 |
| 4,724,607 | 2/1988 | Beuneche et al. | 29/723 |
| 4,800,061 | 1/1989 | Shallenberger | 376/261 |
| 4,842,809 | 6/1989 | Attix et al. | 376/261 |
| 5,068,081 | 11/1991 | Oyama et al. | |

FOREIGN PATENT DOCUMENTS 0138711 4/1985 European Pat. Off. .
2329002 1/1974 Fed. Rep. of Germany .

OTHER PUBLICATIONS

Patent Abstracts of Japan, vol. 14, No. 179 (P-1034), Apr. 10, 1990, JP-2-28595, Jan. 30, 1990.

*Primary Examiner*—Donald P. Walsh
*Assistant Examiner*—Meena Chelliah
*Attorney, Agent, or Firm*—Oblon, Spivak, McClelland, Maier & Neustadt

[57] ABSTRACT

The present invention is made to provide an assembling machine for nuclear fuel assembly, having a simple mechanical construction, in which the time required for inserting the fuel rod can be reduced.

In the prior-art machine, the pull-in rod and its drive mechanism and the like are required to perform the operation for inserting the fuel rod into the supporting grid, thus, the mechanical construction must be complicated. Further, a relatively long time must be required to perform the operation for holding the fuel rod by the pull-in rod, which makes the whole working hours longer. In the machine according to the present invention, a drive mechanism is provided to drive a stopper, by which the regulation of the stopper for regulating the fall-down movement of the fuel rod can be released with ease. Thus, the fuel rod is fallen down by its own weight, so that the fuel rod can be inserted into the grid cell of the supporting grid which is supported by the supporting post. Therefore, the machine construction can be simplified, and it is not necessary to perform the prior-art operation for holding the fuel rod by the pull-in rod, so that the time required for performing the inserting operation of the fuel rod can be reduced.

17 Claims, 3 Drawing Sheets

ASSEMBLING MACHINE FOR NUCLEAR FUEL ASSEMBLY

BACKGROUND OF THE INVENTION

1. Field of the Invention

The present invention relates to an assembling machine which assembles the fuel assembly to be provided for the atomic reactor such as the pressurized-water-type light-water reactor.

2. Background Art

Conventionally, there are provided the fuel assembly as disclosed in U.S. Pat. No. 5,068,081. This fuel assembly is illustrated in FIG. 2.

In FIG. 2, numerals 1 and 2 respectively designate a top nozzle and a bottom nozzle which are positioned apart from each other in a vertical direction and arranged to be faced with each other. A plurality of control-rod guide pipes 3 are extended between and securely fixed to the top and bottom nozzles 1, 2. A plurality of supporting grids 4 are secured to intermediate portions of the respective control-rod guide pipes 3 such that they are positioned apart from each other in a vertical direction.

As illustrated in FIGS. 3 to 5, the foregoing supporting grid 4 is formed such that a plurality of thin-plate-shape straps 7 are assembled perpendicularly to each other into a grid by the mutual fitting of slits 8 which are formed in a longitudinal direction and disposed by an equal pitch in the strap, and consequently, a plenty of grid cells 5 are formed in each grid. At the wall surface of each of the grid cells 5, there is provided a pair of a dimple 9 and a spring 10 which are arranged to be faced with each other, wherein the dimple 9 is used for supporting a fuel rod 6. The fuel rod 6 inserted in the grid cell 5 is supported by being pressed against the dimple 9 by the spring 10.

Meanwhile, there are provided some methods for inserting the fuel rod 6 into the grid cell 5 in the above-mentioned fuel assembly, as disclosed in Japanese Patent Laid-Open Publication No. 2-181699, for example. According to this method, the spring 10 is brought into an escaping state by use of a key member; then, the tip edge portion of the fuel rod 6 is held by a pull-in rod; thereafter, the fuel rod 6 is pulled in and inserted into each of the grid cells 5.

However, the above-mentioned method must require the pull-in rod providing the holding mechanism at its tip edge portion, drive mechanism for this rod, control means for controlling the operations of these mechanisms and the like, which makes the mechanical construction more complex. In addition, it is necessary to perform the holding operation on the fuel rod by the pull-in rod, which raises a drawback in that the time required for inserting the fuel rod into the grid cell must be longer.

SUMMARY OF THE INVENTION

The present invention is given under consideration of the above-mentioned circumstances, therefore, it is an object to provide an assembling machine for nuclear fuel assembly, having a simple mechanical construction, by which the time required for inserting the fuel rod can be reduced.

The assembling machine according to the present invention provides: a base, formed in a plate shape, which is arranged in an inclined manner; a plurality of supporting posts, disposed linearly on the base along with its inclined direction, each of which supports a supporting grid in a state where a grid cell formed in the supporting grid is directed along with the inclined direction; a fuel magazine, provided at an upper portion of the base in its inclined direction, which holds a fuel rod along with the inclined direction in a free-engaged state; a stopper, fixed in the vicinity of a lower edge portion of the fuel magazine in the inclined direction, which regulates a fall-down movement of the fuel rod; and a releasing mechanism which drives the stopper so as to release a regulating operation of the stopper applied to the fuel rod.

In the machine according to the present invention, a drive mechanism drives the stopper so as to release the regulation applied to the fuel rod, and consequently, the fuel rod is fallen down by its own weight so that it can be inserted in the grid cell of the supporting grid supported by the supporting post. In other words, it is not necessary to provide the pull-in rod and its drive mechanism and the like which are required in the prior-art machine, therefore, it is possible to simplify the machine construction. Further, it is not necessary to perform the holding operation of the fuel rod by the pull-in rod which is required in the prior-art machine, thus, it is possible to reduce the time required for performing the inserting operation of the fuel rod.

DESCRIPTION OF THE PREFERRED EMBODIMENT

Figure 1:
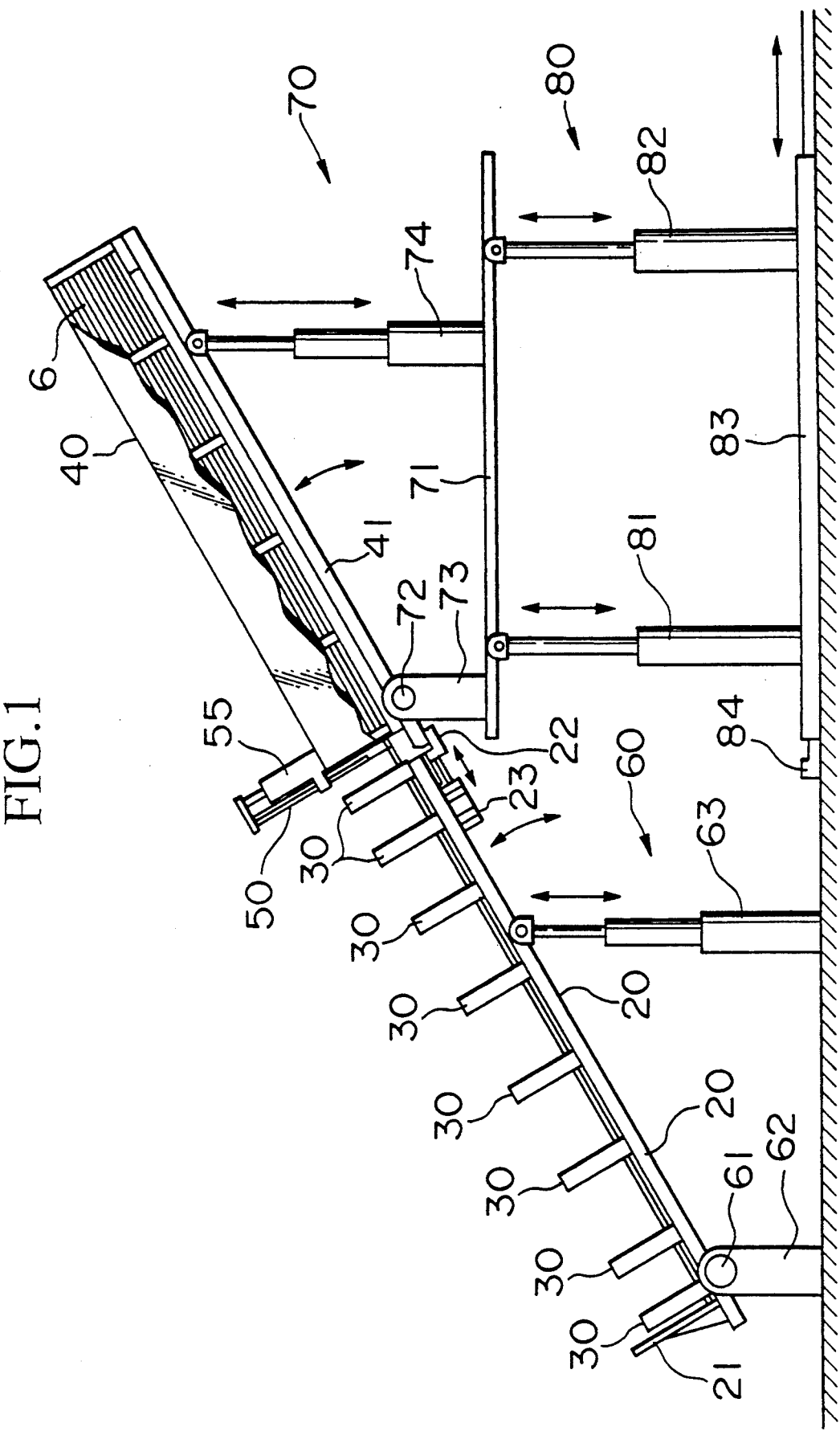
FIG. 1 is a side view illustrating a diagrammatical construction of an assembling machine for nuclear fuel assembly according to an embodiment of the present invention.
Figure 2:
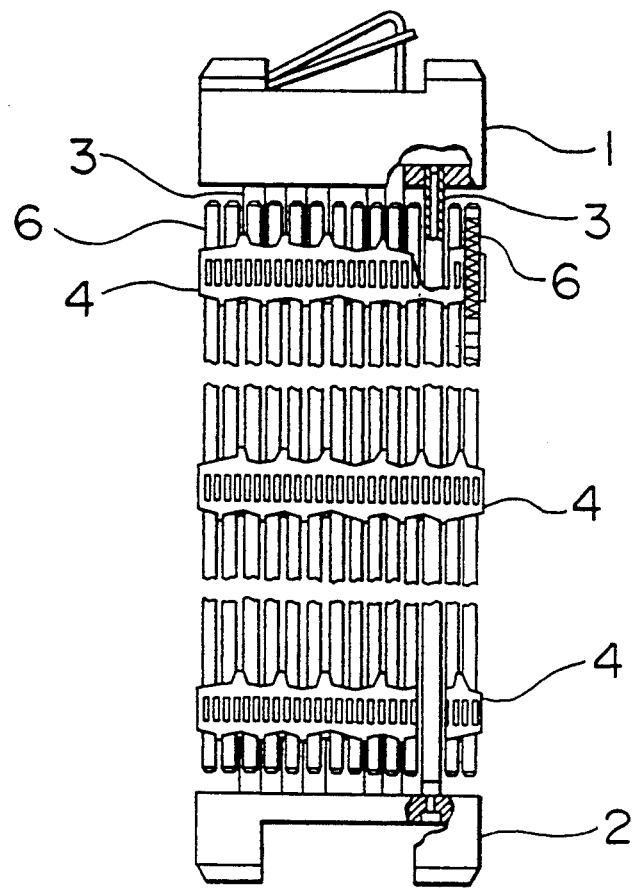
FIG. 2 is a side view illustrating the conventional fuel assembly.
Figure 3:
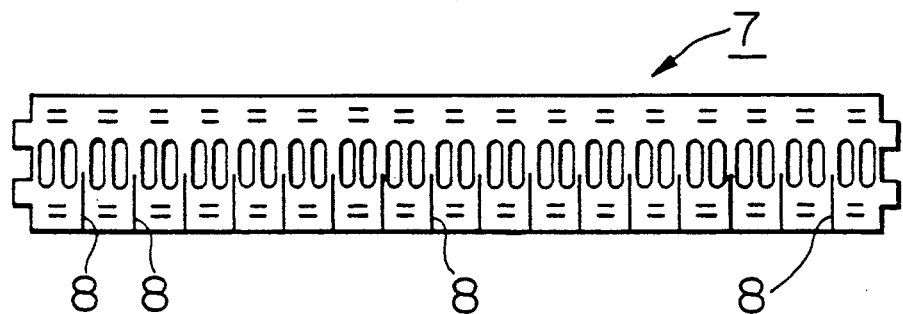
FIG. 3 is a front view illustrating the strap which constructs the supporting grid of the fuel assembly.
Figure 4:
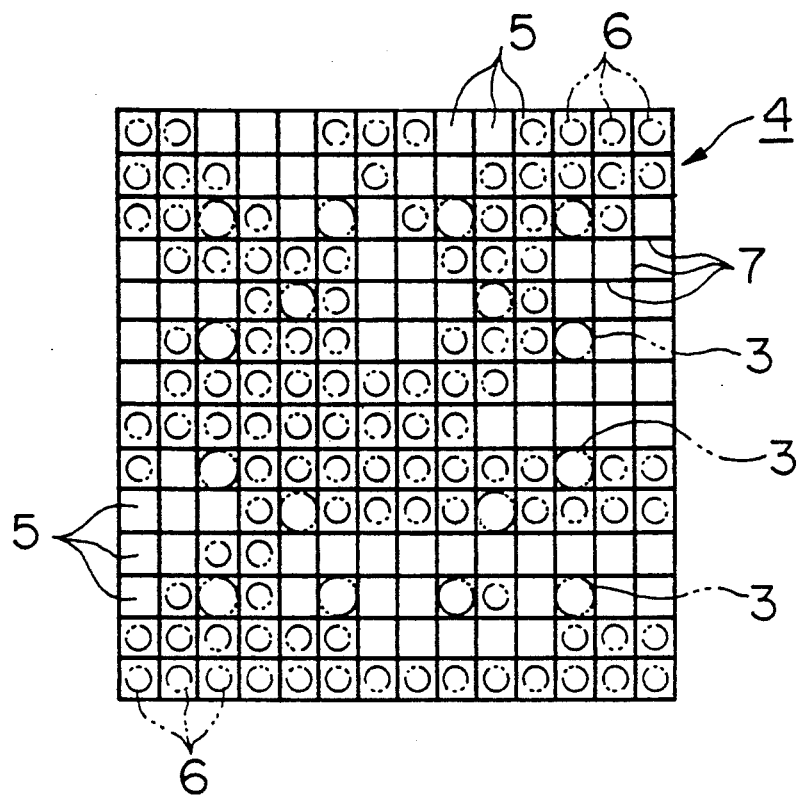
FIG. 4 is a plan view illustrating a state of the supporting grid in which the fuel rods are inserted into the grid cells.
Figure 5:
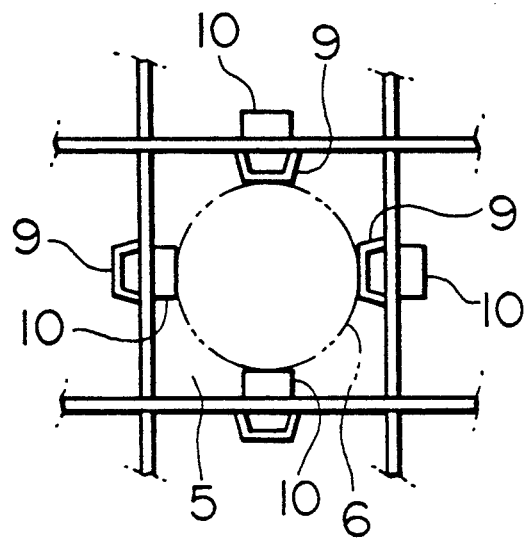
FIG. 5 is an enlarged view of FIG. 4.

The assembling machine according to an embodiment of the present invention will be described in conjunction with FIG. 1. Incidentally, in the description of the present embodiment, the members which are commonly used in the aforementioned fuel assembly will be designated by the same numerals, hence, detailed description thereof will be omitted.

The assembling machine according to the present embodiment is roughly constructed by a base 20, having a rectangular-plate shape, which is provided in an inclined manner to be inclined from one edge side to the other edge side in a longitudinal direction; nine supporting posts 30, respectively disposed on an upper surface of the base 20 in its inclined direction, each of which supports the supporting grid 4 such that the grid cells 5 formed in the supporting grid 4 are inclined along with the inclined direction; a fuel magazine 40, positioned in a relatively upper portion in the inclined direction of the base 20, which holds a plenty of fuel rods 6 in parallel along with the inclined direction in a free-engaged condition (i.e., a free-fall condition); a stopper 50, having a rectangular-plate shape, which covers a lower-edge portion of the fuel magazine 40 in the inclined direction so as to regulate the falling movement of the fuel rod 6; a cylinder (releasing mechanism) 55 which drives the stopper 50 in a direction perpendicularly crossing an extending direction of the fuel magazine 40 so as to release the regulating operation applied to the fuel rod 6; a rotating mechanism 60 which rotates the base 20; another rotating mechanism 70, arranged below the fuel magazine 40, which rotates the fuel magazine 40; a vertical lifting mechanism 80, arranged below the rotating mechanism 70, which vertically lifts up or down the fuel magazine 40 and rotating mechanism 70.

On the upper surface of the foregoing base 20, at a position facing with the lower surface of the supporting post 30 which is located at the lowest position among the supporting posts, there is established a regulating plate 21 which avoids the falling movement of the fuel rod 6 inserted in the supporting grid 4.

Below the lower surface of the upper edge portion of the foregoing base 20, there are provided an angle-type fitting member 22 which fits with a lower surface of a supporting plate 41 supporting the fuel magazine 40 so as to regulate the excessive rotation of this supporting plate 41; and a cylinder 23 which moves this fitting member 22 to be close to or apart from the supporting plate 41.

The foregoing supporting posts 30 are provided to support each of the supporting grids 4 in a state where the opening portions of the grid cells 5 of each of the supporting grids 4 are arranged linearly along with a longitudinal direction of the base 20. Thus, under a state (as illustrated in FIG. 1) where the fuel magazine 40 is fixed on the supporting plate 41, the fuel rod 6 which is fallen down from the fuel magazine 40 can be inserted through the inside of the grid cell 5 of the supporting grid 4.

The rotating mechanism 60 which rotates the base 20 is constructed by a rotation shaft 61 which is fixed at one edge side of the base 20 (i.e., left-edge side of FIG. 1); a supporting base 62 which supports this rotation shaft 61 in a free-rotation manner; and a hydraulic cylinder 63, arranged in the vicinity of the other edge side of the base 20, of which tip edge portion is connected by a pin with respect to the base 20 in a free-rotation manner. The tip edge portion of this hydraulic cylinder 63 and the base 20 are interconnected with each other such that they can be slightly and relatively moved in a horizontal direction, and consequently, the cylinder 63 will not prevent the rotation of the base 20.

The rotating mechanism 70 which rotates the fuel magazine 40 is mounted horizontally on the vertical lifting mechanism 80, and it is constructed by a supporting plate 71 which is lifted up or down by the vertical lifting mechanism 80; a rotation shaft 72 which is fixed to one edge side of the supporting plate 41 supporting the fuel magazine 40; a supporting base 73, planted on the supporting plate 71, which supports the rotation shaft 72 in a free-rotation manner; and a hydraulic cylinder 74, arranged in the vicinity of the other edge side of the supporting plate 41, of which tip edge portion is fixed by a pin to the supporting plate 41 in a free-rotation manner. As similar to the foregoing hydraulic cylinder 63, the tip edge portion of this hydraulic cylinder 74 and the supporting plate 41 are interconnected with each other such that they can be slightly and relatively moved in a horizontal direction, and consequently, the cylinder 74 will not prevent the rotation of the supporting plate 41.

The vertical lifting mechanism 80 is fixed to the supporting plate 71 at the upper edge portion thereof, and it is constructed by hydraulic cylinders 81, 82 which horizontally supports the supporting plate 71 such that this supporting plate can be freely lifted up or down; a base plate 83 which supports these hydraulic cylinders 81, 82; and a rail 84 which supports the base plate 83 such that this base plate can be moved in a direction (horizontal direction in FIG. 1) along with an extending direction of the fuel magazine 40. The above-mentioned base plate 83 and rail 84 construct a mobile mechanism which moves the fuel magazine 40 in a backward direction.

Next, the operation of the assembling machine according to the present embodiment will be described.

First, in an initial state, each of the hydraulic cylinders 63, 74, 81, 82 is contracted so that the base 20 and fuel magazine 40 are located in a horizontal state. At this time, in order to avoid the interference to be occurred between the right edge portion of the base 20 and the left edge portion of the fuel magazine 40, the base plate 83 is moved slightly in a right direction by the rail 84. In addition, the supporting grid 4 is located at each of the supporting posts 30 such that the grid cells 5 are directed in an extending direction (i.e., horizontal direction in FIG. 1) of the base 20. Further, the fuel magazine 40 is mounted on and then fixed to the upper portion of the supporting plate 41 such that the extending direction thereof matches with the extending direction of the base 20. Thereafter, the cylinder 55 is driven to fall down the stopper 50 so that this stopper 50 will cover the front edge surface of the fuel magazine 40, by which the fuel rod 6 is prevented from being pulled out from this front edge surface.

Then, the hydraulic cylinder 63 is stretched, while the base 20 is rotated about the rotation shaft 61, so that the inclining movement of the base 20 is stopped at the predetermined inclined angle.

Then, the base plate 83 is slightly moved close to the base 20 by the rail 84, while the hydraulic cylinders 81, 82 are stretched, so that the supporting plate 71 is lifted up. Such lift-up movement is stopped when the height of the supporting plate 41 is raised approximately identical to the height of the upper edge portion of the base 20. Next, the cylinder 23 attached to the base 20 is stretched so that the fitting member 22 is slightly projected in an upward direction of the base 20, by which the fitting member 22 is brought into contact with the lower surface of the left edge portion of the supporting plate 41. Then, the hydraulic cylinder 74 is stretched so that the supporting plate 41 is rotated about the rotation shaft 72, by which both of the supporting plate 41 and fuel magazine 40 are located approximately on the extending line of the base 20. In short, in this state, the fuel magazine 40 is located at the position which is the upper side of the inclined direction of the base 20 by the same inclined angle. At this time, the lower surface of the left edge portion of the supporting plate 41 comes in contact with the fitting member 22, by which the inclined angle of the supporting plate 41 can be adjusted. In other words, under operation of this fitting member 22, the inclined angle of the fuel magazine 40 can be set approximately identical to the inclined angle of the base 20.

Next, as similar to the prior art, the spring 10 provided in the supporting grid 4 attached to each of the supporting posts 30 is supported in an escaping state, which is the state where the fuel rod 6 can be inserted through the inside of the grid cell 5 without any resistance.

Then, the cylinder 55 is driven so as to gradually lift up the stopper 50. Thereafter, when the lower edge position of the stopper 50 is moved up to the position which is higher than the position of the fuel rod 6 stored in the lowest portion of the fuel magazine 40, the fall-down regulation applied to this fuel rod 6 is released, so that this fuel rod 6 is fallen down toward the supporting grid 4 which is supported by the supporting post 30. Thus, this fuel rod 6 can be inserted through the grid cell 5 of the supporting grid 4. The tip edge portion of the fuel rod 6 to be inserted through the supporting grid 4 comes in contact with the regulating plate 21, so that the fall-down movement is stopped.

Next, as similar to the aforementioned operation, by gradually raising up the stopper 50, the fuel rods 6 stored in the inside of the fuel magazine 40 can be sequentially inserted through the supporting grid 4.

According to the machine of the present embodiment, by raising up the stopper 50 as described above, the fuel rod 6 can be inserted through the supporting grid 4. Therefore, as compared to the prior-art machine which uses the pull-in rod and the like, it is possible to remarkably simplify the mechanical construction of the machine.

Further, since the insert of the fuel rod 6 can be made by merely raising up the stopper 50, the holding operation of the fuel rod 6 by the pull-in rod and the like are not required, by which the inserting operation of the fuel rod 6 can be simplified.

As described above, after inserting the fuel rod 6 through the supporting grid 4, as similar to the prior art, the pull-out operation of the key and the inserting operation of the control-rod guide pipe etc. are performed so that the fuel assembly can be produced.

Next time when the assembling operation of the fuel assembly is performed, the hydraulic cylinders 63, 74, 81, 82 are contracted again so as to set them in an initial state. Thereafter, the other fuel magazine 40 is mounted on the upper portion of the supporting plate 41, and then the foregoing operations are performed.

Incidentally, the shape of the plate-shape base 20 is merely limited to the shape by which the upper surface of the base can be inclined along with one direction, thus, it is not limited to the rectangular shape. In addition, it is obvious that the thickness of the base is not subjected to any restriction.

The present invention is not restricted by the aforementioned embodiment, and consequently, it can contain several kinds of modified examples.

What is claimed is:

1. An assembling machine for nuclear fuel assembly comprising:
   a base, formed in a plate shape, which is arranged in an inclined manner to extend in an inclined direction;
   a plurality of supporting posts, disposed linearly on the base along with its inclined direction, each of which supports a supporting grid, each supporting grid including at least one grid cell, and wherein said plurality of supporting posts support said supporting grids such that said at least one grid cell is directed along the inclined direction;
   a fuel magazine, provided at an upper portion of the base in its inclined direction, which holds a fuel rod along the inclined direction in a free-engaged state;
   a stopper, fixed in the vicinity of a lower edge portion of the fuel magazine in the inclined direction, which regulates a fall-down movement of the fuel rod; and
   a releasing mechanism which drives the stopper so as to release a regulation of the stopper applied to the fuel rod.

2. An assembling machine for nuclear fuel assembly as defined in claim 1 wherein said supporting posts are disposed on an upper surface of the base.

3. An assembling machine for nuclear fuel assembly as defined in claim 1 wherein said stopper is formed approximately in a plate-like shape and this stopper is arranged to be faced with a lower edge surface of the fuel magazine in the inclined direction.

4. An assembling machine for nuclear fuel assembly as defined in claim 1 or 3 wherein said releasing mechanism is constructed by a cylinder which moves the stopper in a direction crossing a moving direction of the fuel rod.

5. An assembling machine for nuclear fuel assembly as defined in claim 1 further including a rotating mechanism for rotating the base about an approximately horizontal axis which crosses approximately perpendicular to a moving direction of the fuel rod.

6. An assembling machine for nuclear fuel assembly as defined in claim 1 further including a rotating mechanism for rotating the fuel magazine about an approximately horizontal axis which crosses approximately perpendicular to a moving direction of the fuel rod.

7. An assembling machine for nuclear fuel assembly as defined in claim 6 wherein a regulating member for regulating a rotation angle of the fuel magazine is further attached to the base at a position which faces with the fuel magazine.

8. An assembling machine for nuclear fuel assembly as defined in claim 6 further including a vertical lifting mechanism which lifts up or down both of the rotating mechanism and the fuel magazine.

9. An assembling machine for nuclear fuel assembly as defined in claim 8 further including a mobile mechanism which moves the fuel magazine in a direction having a horizontal component.

10. An assembling machine for nuclear fuel assembly as defined in claim 1 wherein a regulating plate for avoiding the fall-down movement of the fuel rod inserted in the supporting grid is further located at a position facing with a lower surface of the supporting post which is located at the lowest position among the supporting posts.

11. The assembling machine of claim 1, wherein said base includes a base plate having said plurality of supporting posts disposed therealong, said base further including a separate support plate upon which said fuel magazine is disposed.

12. The assembling machine of claim 11, further including means for vertically lifting said support plate.

13. The assembling machine of claim 12, further including means for varying an inclination angle of said support plate, said means for varying an inclination angle disposed above said means for vertically lifting.

14. The assembling machine of claim 11, further including a fitting member for connecting said base plate to said support plate.

15. The assembling machine of claim 14, further including means for moving said fitting member.

16. An assembling machine for nuclear fuel assembly comprising:

an inclined base plate extending in an inclined direction and having a plurality of supporting posts disposed therealong, each supporting post supporting a supporting grid, each supporting grid including at least one grid cell, and wherein said supporting posts support said supporting grids such that said at least one grid cell has an opening extending in the inclined direction;

a movable supporting plate including means for moving said supporting plate such that said supporting plate is disposed at a position above said inclined base plate;

a fuel magazine disposed on said supporting plate, said fuel magazine having an open bottom end;

a stopper disposed adjacent said open bottom end of said fuel magazine for regulating movement of fuel rods through said open bottom end toward said base plate; and a releasing mechanism for moving said stopper.

17. The assembling machine of claim 16, further including first means for varying an inclination angle of said inclined base plate and second means for varying an inclination angle of said movable support plate.

* * * * *